July 14, 1953 B. D. LEE 2,645,747
HUNT SUPPRESSOR
Filed June 25, 1948
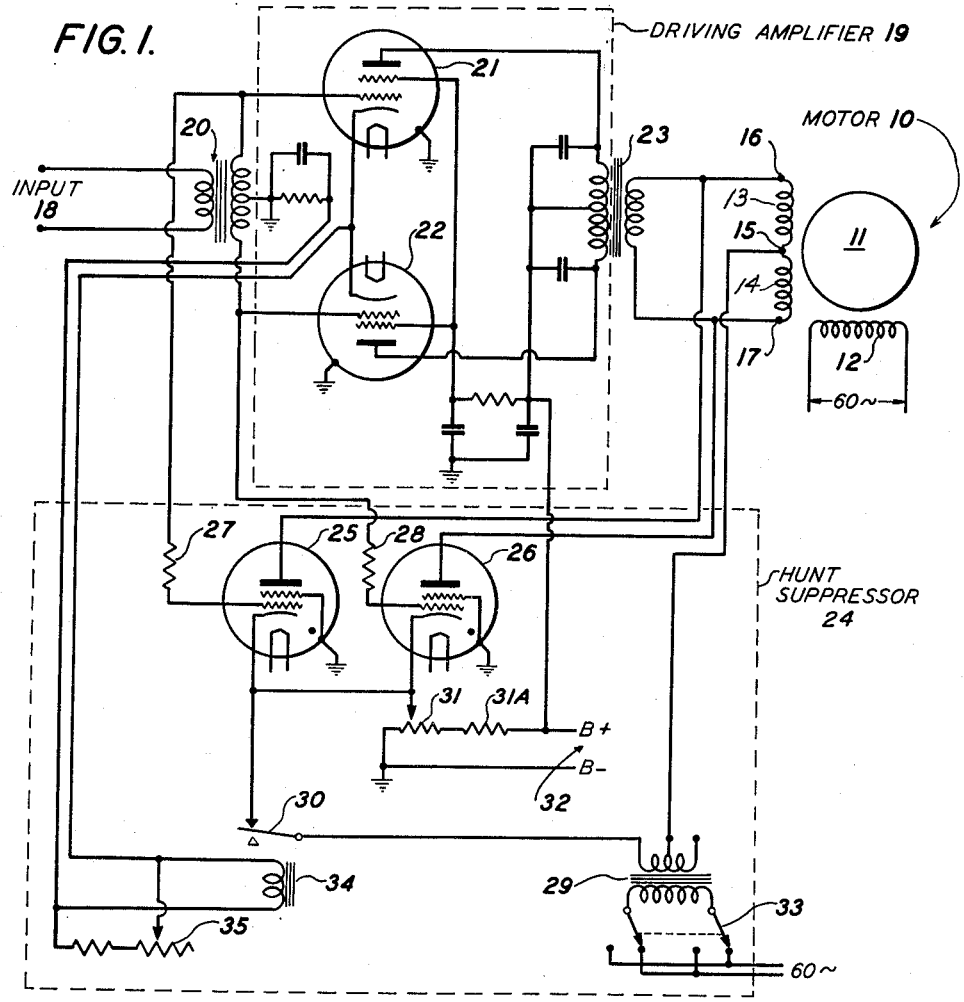
FIG. I.
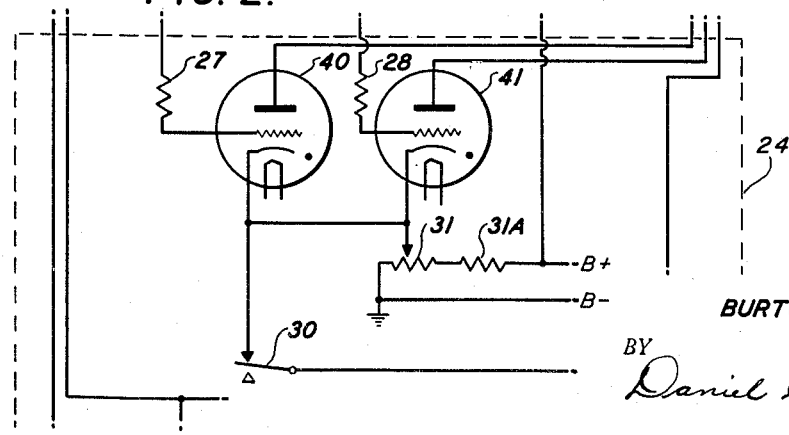
FIG. 2.
INVENTOR.
BURTON D. LEE
BY Daniel Stryker
ATTORNEY

Patented July 14, 1953

2,645,747

UNITED STATES PATENT OFFICE 2,645,747

HUNT SUPPRESSOR

Burton D. Lee, Houston, Tex., assignor to The Texas Company, New York, N. Y., a corporation of Delaware Application June 25, 1948, Serial No. 35,139

12 Claims. (Cl. 318—18)

This invention is concerned with hunt suppression in servo systems and provides improvements for this purpose. The invention serves to suppress hunting of servo systems without reducing sensitivity or adding inertia members which make the system sluggish. It is applicable to a variety of servo systems employing electrical-mechanical linkages to achieve balance position. Thus it is useful in servo mechanism such as those employed in the electrical analogue described and claimed in U. S. patent application Serial No. 791,796, filed December 15, 1947, by Wolf and Lee, now Patent No. 2,569,817.

In servo mechanisms employing electro-mechanical linkages an "error" or unbalance signal is applied to an amplifier or the like which in turn applies a driving force or signal to a balancing motor and causes the motor to run in the direction such that the magnitude of the unbalance signal is decreased. The motor, by means of the slider of a potentiometer or the like mounted on its shaft, controls the error signal, and when balance position is attained no signal is produced and the system should come to rest. Unfortunately, such servo mechanisms have an inherent tendency to hunt. The hunting is the result of the mechanical inertia of the moving parts of the electro-mechanical linkage, for example, the armature and shaft of the balancing motor.

To get rapid response of the system, a relatively high gain amplifier may be used, the mechanical part of the system being driven at high velocity. But the momentum resulting from this high velocity tends to carry the system beyond the point of balance. This results in an error signal of opposite sign which tends to reverse the direction of rotation of the motor and may cause the system to overshoot the balance point in the opposite direction. If the friction or drag on the system is not excessive it will continue to hunt, i. e. to oscillate back and forth across the point of balance without ever stopping at the true null.

Severe hunting can be reduced by reducing the gain of the driving amplifier. But in such case, the driving force becomes so low that there is a zone in the vicinity of the balance point in which the force is insufficient to cause rotation of the motor. Hence the response of the system is sluggish and inaccurate.

The hunting tendency of a servo system may be reduced by inserting in the mechanical linkage a viscosity damping arrangement such as a disk running in a bath of relatively viscous oil. Such damping varies with temperature changes resulting from changes of enviroment or in heating of the oil bath itself by friction. Magnetic damping has also been proposed for reducing hunting. In such case, a thin disk of conducting material is caused to move in a strong magnetic field with the result that power is dissipated in the form of electrical currents that produce heat in the disk. Magnetic damping in free of variation due to temperature changes, but both viscosity and magnetic damping arrangements are objectionable in that the damping disk itself introduces additional inertia in the system. This aggravates the hunting characteristic and requires more damping than the system would have needed had the damping disk not been employed. There is a further objection. In magnetic and viscosity damping, the drag produced is roughly proportional to the velocity attained by the system. This sets an upper limit to the velocity at which the system will operate even under the force of a large unbalance signal and makes the system sluggish. Attempts to overcome the sluggishness by increasing gain of the amplifier increases the tendency of the system to hunt. Thus a vicious cycle is established.

My invention permits the suppression of hunting in servo systems while avoiding all of the difficulties just discussed. It involves supplying a braking force to the driving motor of a servo system within limited ranges on both sides of the balance position and spaced therefrom. On both sides of the balance point there are definite thresholds below and above which no braking is applied. Thus when the error signal exceeds a given value the system is unbraked and is permitted to attain full velocity, thus increasing speed of response. The system is also unbraked on both sides of the balance point when the error signal drops below a given value. In this range, i. e. near the balance point, driving force on the motor is already quite small and cannot be reduced without loss of needed sensitivity. In short, when the error signal is large, the system is unbraked and the response to the signal is rapid. Braking is applied in a range where the signal size is moderate. This reduces velocity of the system and dissipates inertial energy stored in the system. Hence the motor approaches the true balance point at a relatively low velocity and the tendency of the system to overshoot the true balance point and set up the undesired hunting action is reduced. When the error signal is very small, the system is again unbraked and hence has the sensitivity required to seek the true balance point.

Considered in terms of apparatus, the invention contemplates a braking means connected to the motor of a servo system to oppose the drive of the motor by an amplifier or the like, in response to a signal representing system unbalance. Automatic means are provided for rendering the braking means inoperative when the error or unbalance signal rises above a first given value and automatic means are also provided for rendering the braking means inoperative when the signal drops below a second but lower given value. The brake preferably is electrical rather than mechanical, i. e. braking is accomplished by electrical forces introduced into the motor to oppose those driving it toward balance. Such an electrical brake has the advantage of rapid operation and adds no inertial members to the system.

The electrical braking means is actuated by the error signal. When the error signal reduces to a given amplitude, the brake comes into operation and remains in operation until the signal drops to a predetermined lower amplitude, when braking action is again eliminated.

The following text, illustrated by the accompanying drawings, describes a preferred form of the invention applied to a servo system having a two-phase induction motor for balancing purposes.

In the drawings, Fig. 1 illustrates a portion of a servo system embodying the invention. Fig. 2 illustrates a further embodiment of the invention.

Fig. 1 is a wiring diagram of a portion of a servo system. The system has a reversible induction motor 10 which operates on the shading pole principle. The motor has an armature 11 which rotates in the field of a main coil 12 excited from a 110 volt, 60 cycle power line. The motor has two sets 13, 14 of shading coils or poles. The coils have a common terminal 15 and outside terminals 16, 17. The terminal 16 is considered to be the clockwise terminal and the terminal 17 is considered to be the counter-clockwise terminal. The motor also is able to operate as a phase sensitive induction motor through application of a signal across the clockwise and counter-clockwise terminals, the common connection between the two sets of shading poles being neglected. For example, a signal of the same frequency as the excitation (say 60 cycles) to the main coil, applied across the outside terminals 16, 17 of the shading coils, will produce rotation of the motor, providing phase is correct. A reversal of phase of this signal will result in a reversal of the direction of rotation of the motor.

Conventional means (not shown) are provided so that motor position controls the size of an error or unbalance signal. Thus the slider of a potentiometer may be mounted on the motor shaft with the potentiometer connected to the input 18 of a driving amplifier 19. The error signal is applied to the driving amplifier through a stepdown transformer 20 employed for impedance matching purposes.

The amplifier is a conventional push-pull class AB₁ type. The amplifier employs tubes 21, 22, each containing a plate, a cathode, and at least one grid. The tubes are shown as tetrodes, but may be triodes or any other type conventionally employed in a class AB₁ amplifier. The output of the driving amplifier is connected to the shading coils of the motor through a transformer 23, opposite ends of the output winding of the transformer being connected respectively to the clockwise and counter-clockwise terminals of the shading coils.

A hunt suppressor 24 is shown in the lower portion of Fig. 1. It employs two gas tetrodes 25, 26 of, for example, type 2050. These tetrodes have their grids connected in push-pull and receive error signal in common with the control grids of the amplifier tubes from the output of the stepdown transformer. Resistors 27, 28 are provided to offer some isolation of the grids of the gas tetrodes from the grids of the tube in the driving stage. The system will operate without the isolating resistors but operates much better with them because they isolate the short circuiting effect of the grids of the gas tetrodes when conducting from the grids of the tubes in the driving stage.

The plate of the gas tetrode 25 is connected to the clockwise terminal of the motor shading poles. The plate of the other gas tetrode 26 is connected to the counter-clockwise terminal of the shading poles.

The common terminal between the two sets of shading poles is connected through the secondary of a transformer 29 and a relay operated switch 30 to the cathodes of the gas tetrodes, which are connected together in parallel. The cathodes of the gas tetrodes are also connected to the slider of a resistance 31 which in combination with another resistance 31A constitutes a voltage divider placed across a B-plus source 32. In this way the cathodes of the gas tetrodes are maintained at a preselected positive voltage with respect to ground.

The grids of the tetrodes are returned to ground. Hence the positive voltage on the cathodes constitutes a grid bias which may be considered as a holding bias for the gas tetrodes.

As a result of the excitation of the main field coil 12 of the motor, voltages equal in magnitude and phase are generated in the two sets of shading poles or windings. So the plate-cathode voltages of the gas tetrodes are equal and in phase. Grid excitation of the gas tetrodes, however, is equal but opposite in phase and is dependent upon the existence of a signal supplied to the grids of the tubes in the amplifier. Hence, if there is no error signal at the input, there is no grid excitation for the tubes in the hunt suppressor or in the driving amplifier.

The magnitude of the grid or holding bias of the gas tetrodes is adjusted by the slider on the resistance 31 to a value such that the voltage appearing in the plate-cathode circuit of the gas tetrodes is insufficient to strike the tube and cause conduction, if there be no grid drive on the tubes. If at a given instant the voltage across the plate-cathode circuit of a gas tetrode is positive on the plate and negative on the cathode and an error signal is applied to the input of the amplifier so that the upper tube 21 has its grid swung positive while the lower tube 22 has its grid swung negative, the grid of the left hand tetrode 25 will be swung positive. If the magnitude of this positive swing on the left hand gas tube is sufficient to overcome the holding bias established by the resistance 31 the tube will strike, that is, it will become conductive. In this way a conductive path is set up to permit a current flow from the clockwise terminal through the tetrode to cathode and through the relay contact and the secondary winding of the transformer 29 back to the common terminal. This current flow will tend to produce a clockwise rotation of the motor.

As the grid of the left hand tetrode is driven positive, the grid of the other tetrode is driven negative, therefore the latter tube cannot become conductive since it is already biased to cutoff by the holding bias, the effect being merely to drive the grid still farther negative. Hence no conductive path is established between the counter-clockwise terminal and the common terminal.

The phasing of the transformer 23 in the plate circuit of the amplifier stage having been properly chosen, the signal which causes conduction of the left hand gas tetrode will tend to cause a counter-clockwise rotation of the servomotor. Hence the left hand gas tetrode produces a tendency to rotate which is contrary to the normal direction of rotation of the motor established by an error signal of this phase through the amplifier. If the phase of the error signal is reversed, conditions reverse in the gas tetrodes. The right hand tetrode becomes conductive during its positive half cycle while the left hand tetrode remains at cutoff or below. The effect of the gas tetrodes is therefore to permit a passage of current to the shading coils which opposes the normal direction of rotation of the servomotor produced through the amplifier and hence to act as a brake on the system.

By proper adjustment of the holding bias of the resistance 31 it is possible to set a minimum threshold below which the gas tetrodes will not operate. Thus the gas tetrodes will operate only when the grid driving signal is greater than a certain value determined by the holding bias and the voltage appearing across the plate cathode circuit. So for very small error signals the gas tetrodes are inoperative, but for error signals above a certain amplitude the gas tetrodes apply a counter or braking force opposing the action of the driving amplifier.

The transformer 29 is provided to permit the introduction of the voltage either in phase or out of phase with the plate-cathode voltage of the gas tetrodes. The amount of current flowing and tending to produce braking action may be increased or decreased by selection of the position of a double-pole double-throw switch 33 on the primary of the transformer 29 and energized by 60 cycle current.

As long as the switch 30 in the cathode circuit of the gas tetrodes remains closed, the braking action will exist for moderate or large error signals, but in a class AB₁ amplifier stage, plate current necessarily increases with increasing grid drive, and this characteristic is employed in the circuit of Fig. 1 to cut out the braking system or hunt suppressor when the error signal rises above a given level. A relay coil 34 is placed in the cathode circuit of the driving stage and is shunted by an adjustable resistor 35. This relay shunt is adjusted so that for a moderate error signal the relay does not operate. For error signals above the operating level of the relay, however, the cathode circuit of the gas tetrodes in the hunt suppressor is opened by the switch 30 controlled by the relay. So for large error signals, due to the increasing plate-cathode current of the tubes in the driving amplifier, the relay operates to render the braking system inoperative.

To consider the operation of the system as a whole let it be assumed that a large error signal is being applied to the driving amplifier through the transformer 20 to cause rotation of the servomotor. As the system approaches the balance point, the magnitude of the error signal decreases, as does the plate current of the tubes in the driving amplifier. At a certain point determined by the setting of the relay shunt the plate current becomes small enough that the relay switch 30 closes the cathode circuit of the gas tetrodes in the hunt suppressor. At this point braking is applied, the degree of braking being determined by the position of the switch 33 in the primary of the transformer 29. The braking action is applied to the motor, though it decreases somewhat in magnitude as the error signal continues to decrease, until the magnitude of the error signal is insufficient to overcome the holding bias applied to the cathodes of the gas tetrodes through the resistance 31. Then the braking action stops and the motor is allowed to run on to the true zero or balance point. If the adjustment of relay sensitivity and holding bias of the gas tetrodes is proper, velocity of the system will be very high during the period that a large error signal is applied, will be reduced sharply during the period of moderate signal and will come nearly to a stop before the motor has reached a position that is too small to produce an error signal for brake actuation. In this way, the major portion of the energy stored in the mechanical system is dissipated before braking is relaxed and then the error signal is so small that no appreciable velocity will result even though the braking action is eliminated. Hence the system will coast to a stop. Should it overshoot only slightly no further braking action will be applied, but if it should overshoot appreciably the error signal will again apply the braking and damp out hunt in one or two cycles rather than permitting it to be sustained.

A variety of changes may be made in the apparatus of Fig. 1 without departing from the concept of the invention. As illustrated in Fig. 2, gas triodes 40, 41, for example tubes of type 884, can be substituted for the gas tetrodes in the hunt suppressor circuit. Tetrodes, however, are preferred because of their higher plate control ratio.

It is not essential that gas tubes be employed. Hard, i. e. high vacuum tubes, may be substituted for them but this requires a higher voltage in the secondary of the transformer 29 in order to obtain sufficient current flow for appreciable braking.

The characteristics of a class AB₁ amplifier are particularly desirable in the practice of the invention as illustrated in Fig. 1, but such an amplifier is not required. Any device which has a threshold below which it will not operate may be inserted in the system to measure the magnitude of the error signal and operate the relay for disabling the hunt suppression circuit. Thus any relay which requires a minimum signal magnitude for opening a switch may be employed.

The invention does not require the particular type of servomotor illustrated. The system of Fig. 1 will operate with any two-phase motor, braking action being achieved by passing direct current through one of the windings to set up a counterforce to the amplifier output and controlling this direct current by the hunt suppressor system. This will produce an electro-magnetic drag upon the motor during the braking period.

The invention permits hunt suppression without sacrificing sensitivity near the point of balance nor velocity of operation with large error signal. It is reliable in its operation and is independent of such variable elements as friction, temperature, etc.

I claim:

1. In a servo system having a reversible motor movable back and forth through a balance position, the combination which comprises an amplifier having its input connected to a source of signal representative of sign and amount of divergence of the system from the balance position and its output connected to the motor and tending to drive the motor to the balance position in response to the signal, and electronic means which opposes the driving action of the amplifier through two limited ranges respectively adjacent the extremities of another limited range which includes the balance position and extends on both sides thereof, and means for preventing the electronic means from opposing the driving action of the amplifier in said other range.

2. In a servo system having a reversible motor movable back and forth through a balance position, the combination which comprises an amplifier having its input connected to a source of signal representative of sign and amount of divergence of the system from the balance position and its output connected to the motor and tending to drive the motor to the balance position in response to the signal, and electronic means connected to the motor to supply thereto power which opposes the driving action of the amplifier on both sides of the balance position only through limited ranges removed from the balance position and means which prevents the electronic means from supplying power to the motor to oppose the driving action of the amplifier in a third limited range including the balance position and extending on both sides thereof to the respective adjacent limits of the ranges in which the opposition occurs.

3. In a servo system having a reversible motor movable back and forth across a balance position at which no energy is supplied to the motor and means for producing a signal representative of sign and amount of divergence of the system from the balance position, the combination which comprises a push-pull class AB$_1$ amplifier having its input connected to the signal producing means and its output connected to the motor and tending to drive it to the balance position in response to the signal, an electronic braking means connected to the motor and the amplifier and opposing the driving action of the amplifier, a relay connected to the plate circuit of the amplifier for rendering the braking means inoperative when the signal rises above a given value and automatic means for rendering the braking means inoperative while energy is being applied to the motor but when the signal drops below a second given value that is lower than the first but substantially above the value for balance position.

4. In a servo system having a reversible motor movable back and forth across a balance position at which no energy is supplied to the motor and means for producing a signal representative of sign and amount of divergence of the system from the balance position, the combination which comprises an amplifier having its input connected to the signal producing means and its output connected to the motor and tending to drive it to the balance position in response to the signal, the amplifier being provided with grid and plate and so arranged that plate current increases with increasing grid drive, an electronic braking means connected to the amplifier and the motor and opposing the driving action of the amplifier, a relay connected to the plate circuit of the amplifier for rendering the braking means inoperative when the signal rises above a given value and automatic means for rendering the braking means inoperative while energy is being supplied to the motor but when the signal drops below a second given value that is lower than the first but substantially above the value corresponding to balance position.

5. In a servo system, the combination which comprises a two-phase motor having two shading coils with a common terminal and arranged to rotate clockwise and counter-clockwise through a balance position, means for producing a signal representative of sign and amount of divergence of the system from balance position, an electronic amplifier having its input connected to the signal producing means and its output connected to the shading coils, and an electronic braking means comprising a pair of tubes connected in push-pull each having a control grid, a plate, and a cathode, the cathodes of the tubes being connected to the common terminal, the plates being connected respectively to the non-common terminals of the shading coils, and the grids being connected to the amplifier input, and means for automatically deenergizing the tubes when the signal rises above a given value.

6. In a servo system, the combination which comprises a two-phase motor having a plurality of field windings and rotatable back and forth through a balance position, means for producing a signal representative of sign and amount of divergence of the system from the balance position, an electronic amplifier having its input connected to the signal producing means and its output connected to the field windings and adapted to drive the motor toward balance position in response to the signal, electronic means for energizing a field winding with a force opposing that supplied thereto by the amplifier, means for automatically interrupting the operation of the electronic means when the signal falls below a given low value and means for automatically interrupting the action of the electronic means when the signal rises above a given higher value.

7. In a servo system, the combination which comprises a motor having field windings and rotatable back and forth through a balance position, means for producing a signal representative of sign and amount of divergence of the system from the balance position, an electronic amplifier having its input connected to the signal producing means and its output connected to the field windings and adapted to drive the motor toward balance position in response to the signal, electronic means for energizing the field windings with force opposing that supplied thereto by the amplifier, means for automatically interrupting the operation of the electronic means when the signal falls below a given low value and means for automatically interrupting the action of the electronic means when the signal rises above a given higher value.

8. Apparatus according to claim 7 in which the amplifier is of a type in which plate current increases with increasing grid drive, and the means for interrupting the operation of the electronic means at the higher value is a relay energized by the plate current.

9. Apparatus according to claim 7 in which the electronic means comprises a pair of gas tubes connected in push-pull and having cathodes and plates connected to the field windings and grids connected to the signal input.

10. Apparatus according to claim 7 in which the electronic means comprises a pair of high vacuum tubes connected in push-pull and having cathodes and plates connected to the field windings and grids connected to the signal input.

11. In a servo system having a reversible motor movable back and forth across a balance at which no torque is developed and means for producing a signal representative of sign and amount of divergence of the system from the balance position, the combination which comprises a driving means connected to the signal producing means and to the motor, the driving means tending to drive the motor to its balance position, braking means connected to the motor and opposing the driving action of the driving means, automatic means for rendering the braking means inoperative when the signal rises above a first given value and automatic means for rendering the braking means inoperative while torque is still developed by the motor but when the signal drops below a second given value that is lower than the first, but substantially above the value for balance position.

12. In a servo system having a reversible motor movable back and forth across a balance position at which the motor develops no torque and means for producing a signal representative of sign and amount of divergence of the system from the balance position, the combination which comprises an amplifier having its input connected to the signal producing means and its output connected to the motor and tending to drive it to the balance position in response to the signal, braking means connected to the motor and opposing the driving action of the amplifier, automatic means for rendering the braking means inoperative when the signal rises above a first given value and automatic means for rendering the braking means inoperative while the motor is still developing torque but when the signal drops below a second given value that is lower than the first but substantially above the value for balance position.

BURTON D. LEE.

References Cited in the file of this patent

UNITED STATES PATENTS

| Number | Name | Date |
|---|---|---|
| 2,184,576 | Beyerle | Dec. 26, 1939 |
| 2,297,187 | Johnson | Sept. 29, 1942 |
| 2,355,537 | Jones | Aug. 8, 1944 |
| 2,489,689 | Wald | Nov. 29, 1949 |
| 2,574,837 | Mouzon | Nov. 13, 1951 |